United States Patent [19]

van der Sijpt

[11] Patent Number: 5,802,293
[45] Date of Patent: Sep. 1, 1998

[54] INTEGRATED PLANT ENVIRONMENT UTILIZING AN ADVANCED PROGRAM-TO-PROGRAM SERVER ENABLING COMMUNICATIONS BETWEEN PROGRAMS RUNNING IN DIFFERENT COMPUTING ENVIRONMENTS

[75] Inventor: George van der Sijpt, Koewacht, Netherlands

[73] Assignee: The Dow Chemical Company, Midland, Mich.

[21] Appl. No.: 633,144

[22] Filed: Apr. 16, 1996

Related U.S. Application Data

[63] Continuation-in-part of Ser. No. 83,902, Jun. 28, 1993, abandoned.

[51] Int. Cl.$^6$ .................................................. G06F 15/16
[52] U.S. Cl. .......................... 395/200.33; 395/200.57; 395/200.79
[58] Field of Search ..................... 395/200.31, 200.33, 395/200.57, 200.6, 200.79

[56] References Cited

U.S. PATENT DOCUMENTS

| | | | |
|---|---|---|---|
| 4,739,398 | 4/1988 | Thomas et al. | 358/84 |
| 4,914,619 | 4/1990 | Harris et al. | 395/200 |
| 5,218,697 | 6/1993 | Chung | 395/650 |
| 5,218,713 | 6/1993 | Hammer et al. | 395/800 |
| 5,291,416 | 3/1994 | Hutchins | 364/474.16 |
| 5,313,581 | 5/1994 | Giokas et al. | 395/200 |
| 5,317,568 | 5/1994 | Bixby et al. | 370/85.6 |
| 5,329,619 | 7/1994 | Pagé et al. | 395/200 |
| 5,341,478 | 8/1994 | Travis, Jr. et al. | 395/200 |
| 5,394,522 | 2/1995 | Sanchez-Frank et al. | 395/159 |
| 5,586,240 | 12/1996 | Khan et al. | 395/769 |

OTHER PUBLICATIONS

Jay Ranade et al, "Advanced SNA Networking," McGraw-Hill Inc, 1991, pp. 191–193.

Verhoeff, T.J., "The APPC Project," Proceedings Share Europe Anniversary Meeting, 7 Oct. 1991, Amsterdam, Netherlands, pp. 853–874.

Lantz, K.A., et al., "Rochester's Intelligent Gateway," *Computer*, vol. 15, No. 10, Oct., 1982, Long Beach, US, pp. 54–68.

Einert, D., et al., "The Snatch Gateway: Translation of Higher Level Protocols," *Journal of Telecommunication Networks*, vol. 2, No. 1, 1983, Maryland, US, pp. 83–102.

(List continued on next page.)

*Primary Examiner*—Mehmet B. Geckil
*Attorney, Agent, or Firm*—Dale H. Schultz; Daniel N. Yamnuzzi

[57] ABSTRACT

The present invention provides for an integrated plant environment which includes a business computing environment, such as an IBM environment, to run business programs that manage business aspects of the plant, a second, different computing environment, such as a DEC environment, configured to run manufacturing programs that control production of products, a gateway configured to allow communication between the business programs and the manufacturing programs, and an advanced program-to-program server which enables communication between the two different computing environments. The present invention also includes a method for interfacing programs in a first computing environment with programs in a second computing environment. The method consists of allocating a server process to a first program in one of the first and second computing environments, wherein the first program in turn requests a session with a second program in the other of the first and second computing environments, establishing a first session between said first program and said allocated server process, and establishing a second session between said second program and said allocated server process. The first and second sessions host a conversation between said first program and said second program.

12 Claims, 9 Drawing Sheets

OTHER PUBLICATIONS

King, K. J., et al., "An Architecture for Local Area Network Servers," Computer Networks: COMPCON 82 Fall Conference Proceedings, 20 Sep. 1982, Washington, DC, pp. 681–686.

Grundner, W., "Alle fur einen: Client Server Computing—das Netzwerkkonzept der Zukunft," *Elektronik*, vol. 40, No. 19, 19 Mar. 1991, pp. 96–100.

Patent Abstracts of Japan, vol. 10, No. 308 (p–508), 21 Oct. 19086 and JP, A, 61 121 153 (NEC Corp), 9 Jun. 1986.

INTEGRATED PLANT ENVIRONMENT UTILIZING AN ADVANCED PROGRAM-TO-PROGRAM SERVER ENABLING COMMUNICATIONS BETWEEN PROGRAMS RUNNING IN DIFFERENT COMPUTING ENVIRONMENTS

This application is a continuation-in-part of abandoned application Ser. No. 08/083,902, filed Jun. 28, 1993, herein fully incorporated by reference.

BACKGROUND OF THE INVENTION

1. Field of the Invention

The present invention relates generally to an integrated plant environment and more particularly to a computer integrated manufacturing environment which includes a client server capable of interfacing programs in one computing environment with programs in another computing environment.

2. Related Art

With the advent of increased computing power at cost-effective prices, today's industry is increasing its use of computer solutions for handling its business needs. However, the evolutionary cycle to computerization followed by many in industry has led to an eclectic assortment of computer solutions within a given plant. For example, company X may have implemented an IBM (International Business Machines) mainframe to handle all of its business and financial needs and a VAX (available from the Digital Equipment Corporation) for controlling manufacturing and production operations.

Up to a certain point, this type of diversity presents few problems for a company. Each computerized operation functions well independently of the others. However, as companies begin integrating computerized business operations with independently computerized production operations, interfacing difficulties need to be resolved. For complete integration, a company must be able to exchange data from its production computers (e.g., VAX clusters) with data in its business computers (e.g., IBM mainframe). This would allow the company to automate its inventory updates, or creation of shipping schedules and the like.

To meet this integration need, several methods have been developed to allow such an exchange of data between different computing environments. For example, one computer manufacturer provides a gateway that allows VAX machines to interface with IBM computers and their clones or compatibles. For a VAX to communicate with an IBM via this gateway, it must use proprietary software libraries that allow such communication. For example, one could use a DECnet/SNA VMS APPC/LU6.2 programming interface routine, which is an advanced program-to-program communication (APPC) routine based on IBM's System Network Architecture Logical Unit (LU) 6.2 implementation. Such a routine would allow communications with all IBMs (and their clones) using LU6.2 communications, including personal computers.

Programs running on a VAX that need to communicate with an IBM program could use the APPC/LU6.2 routines and associated software libraries. However, there are some shortcomings to this conventional solution. Programming with the APPC routines can be a difficult and time-consuming task and these routines require a substantial allocation of network resources and of the computer's communications resources. One reason for this is that programs written using APPC require "calls." Some of the APPC calls require as many as twenty (20) parameters. The parameters specified must be maintained on the VAX. Some parameters must be coordinated with associated definitions on the IBM side as well. Further, because some of these parameters are IBM oriented and some are VAX oriented, system developers require expertise in both environments to handle the calling parameters appropriately.

In this document, the term "program" is used to refer to applications or other types of computer programs, routines, processes and the like. An application typically comprises one or more programs grouped together to perform a function.

Another problem with the conventional gateway solution is that each VAX connected to the gateway must have the software library to communicate with the IBM. In other words, each VAX wishing to establish or receive a link to the IBM via the gateway must have a duplicate copy of the software library. This results in additional problems associated with management of the gateway environment. The parameters mentioned above must be maintained and updated on each system implemented, and often the updates must take place simultaneously. This type of maintenance where numerous systems are involved is a difficult management task. Another shortcoming is the cost associated with licensing the software libraries for use on each VAX that is to communicate with the IBM.

Still another shortcoming of currently available gateway technology is that the IBM mainframe can not initiate a conversation on a VAX unless an LU6.2 session has already been established with the IBM or unless the VAX has established a session with a gateway connected to the IBM. According to conventional wisdom, the IBM can not "look for" and find one of a number of VAXes on the network. If the IBM has data that it would like to send to a particular VAX, the IBM cannot send that data unless the VAX first establishes a connection with the IBM.

What is needed is a system and method for interfacing multiple client programs running on multiple client computers with programs in another computing environment. The ideal solution should provide a single point of control to alleviate the management problems existing in conventional systems.

SUMMARY OF THE INVENTION

The instant invention solves the above-mentioned problem to a large degree. In one aspect, the instant invention is an integrated plant environment, comprising four main elements. The first element is a business computing environment, comprising at least one first computing system configured to run business programs that manage business aspects of the plant. The second element is a plurality of second computing systems, configured to run manufacturing programs that control production of products, wherein said first and second computing systems are not of the same computing environment. The third element is a gateway configured to allow communication between said business programs running on said first computing system and said manufacturing programs running on one of said plurality of second computing systems. The fourth element is an advanced program-to-program server, configured to establish and maintain a predetermined, fixed number of first sessions with said business programs running on said first computing system and to establish, on receipt of a connection request, a second session with one of said manufacturing programs running on one of said plurality of second computing systems, thereby establishing a server/client relationship such that said manufacturing programs in each of said plurality of second computing systems can communicate with said business programs in said first computing system via said gateway.

In a second aspect, the instant invention is a computer integrated manufacturing environment, comprising three major elements. The first element is an IBM computing environment, configured to run business programs that manage business aspects of a manufacturing plant. The second element is a DEC computing environment, configured to run manufacturing programs that control product manufacturing. The third element is an advanced program-to-program server, configured to establish a server/client relationship such that said manufacturing programs can communicate with said business programs. The third element, the advanced program-to-program server, further comprises two secondary elements. The first secondary element is a server process, configured to establish and maintain a predetermined, fixed number of logical unit sessions allowing said business programs running in an IBM environment to initiate conversations with said manufacturing programs running in a DEC environment. The second secondary element is a controller process, coupled to said server process, configured to accept connection requests from said business and manufacturing programs and to allocate a server process to a program requesting connection.

An advanced program-to-program server (APS) provides a system and method for enabling programs in one processing environment to exchange data with programs running in a different processing environment. The APS forms a server relationship to multiple client computers providing a single point for control of communications with one or more computers in another computing environment.

A benefit of this client server relationship is that the programmers of the client systems are only concerned with the issue of which communication features to implement at the application level and how to implement those features. They are not concerned with communication session connectivity techniques required to communicate to the other computing environment. Techniques necessary for communication session connectivity between a client system and the other computing environment are accessed by the client system using APS client routines which are installed on the client system and which provide transparent communication through the APS to the other computing environment. As a result, a single point of control is provided to perform the communications interface between the two computing environments. This results in significantly reduced requirements for management of the communications links.

The APS supplies transparent communication services between programs in each communications environment. As a result, the programs use their own communications techniques to communicate with one another. Simple SAA CPI-C (Systems Application Architecture Common Programming Interface for Communications) callable routines are provided for the client system to initiate the interface and to interact across the interface once it has been initiated.

The APS establishes and maintains multiple server processes, which in turn establish and maintain a predetermined fixed number of communications sessions with programs running in a first computing environment. When a program in one computing environment wishes to communicate with another program in another computing environment, it requests a session via APS. Upon receipt of such a request, an APS controller process designates a server process to form this session. The session is established between a program in the first computing environment with a program in the second computing environment. The session can be disconnected at the request of either program.

With respect to load balancing within the context of a fixed number of sessions, for some functions where the client system does not need to be interactively connected, a server process can send data to a file in the network environment and the client which initiated the request for that data can then acquire the information using normal file transfer techniques. This feature enables one client to serve as a queue manager for the requests from a set of other clients respective to the data available via a specific LU session.

Further features and advantages of the present invention, as well as the structure and operation of various embodiments of the present invention, are described in detail below with reference to the accompanying drawings.

BRIEF DESCRIPTION OF THE DRAWINGS

The present invention will be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE INVENTION

1. Overview and Discussion of the Invention

The present invention, an advanced program-to-program server (APS), is a system and method for enabling a data exchange between programs running in two different processing environments. Specifically, the APS allows one or more clients in one computing environment to interface to one or more hosts in a second computing environment.

According to a preferred embodiment, the APS provides a communications interface through which multiple VAXes can communicate with multiple IBM mainframes. More specifically, in this embodiment, the server allows multiple VAXes to interface via DECnet to communicate with the IBM using LU6.2 communications.

Portions of this patent document discuss the APS in terms of the preferred VAX and IBM embodiment. However, it would be obvious to a person skilled in the relevant art how the APS can be used to interface other computer environments using other communications networks, standards and protocols. For example, TCP/IP is a standard protocol which can be used alone or simultaneously with other protocols to communicate between the APS and the client systems.

The APS system is designed according to a client-server concept. That is, communications to the IBM programs are handled by the APS, and client systems (VAXes) use the APS system to exchange information, which can include data and statuses, with the IBM program. A benefit of this client server relationship is that the programmers of the client systems are only concerned with the issue of which communication features to implement at the application level and how to implement those features. They are not concerned with communication session connectivity techniques required to communicate to the other computing environment. The client system facilitates techniques necessary for communication session connectivity by calling supplied APS client routines which are CPI-C based routines. These routines provide transparent communications through the APS to the IBM programs. Because most of the communications functions are handled by the APS, it is easy for client programs to communicate with the IBM.

Figure 1:
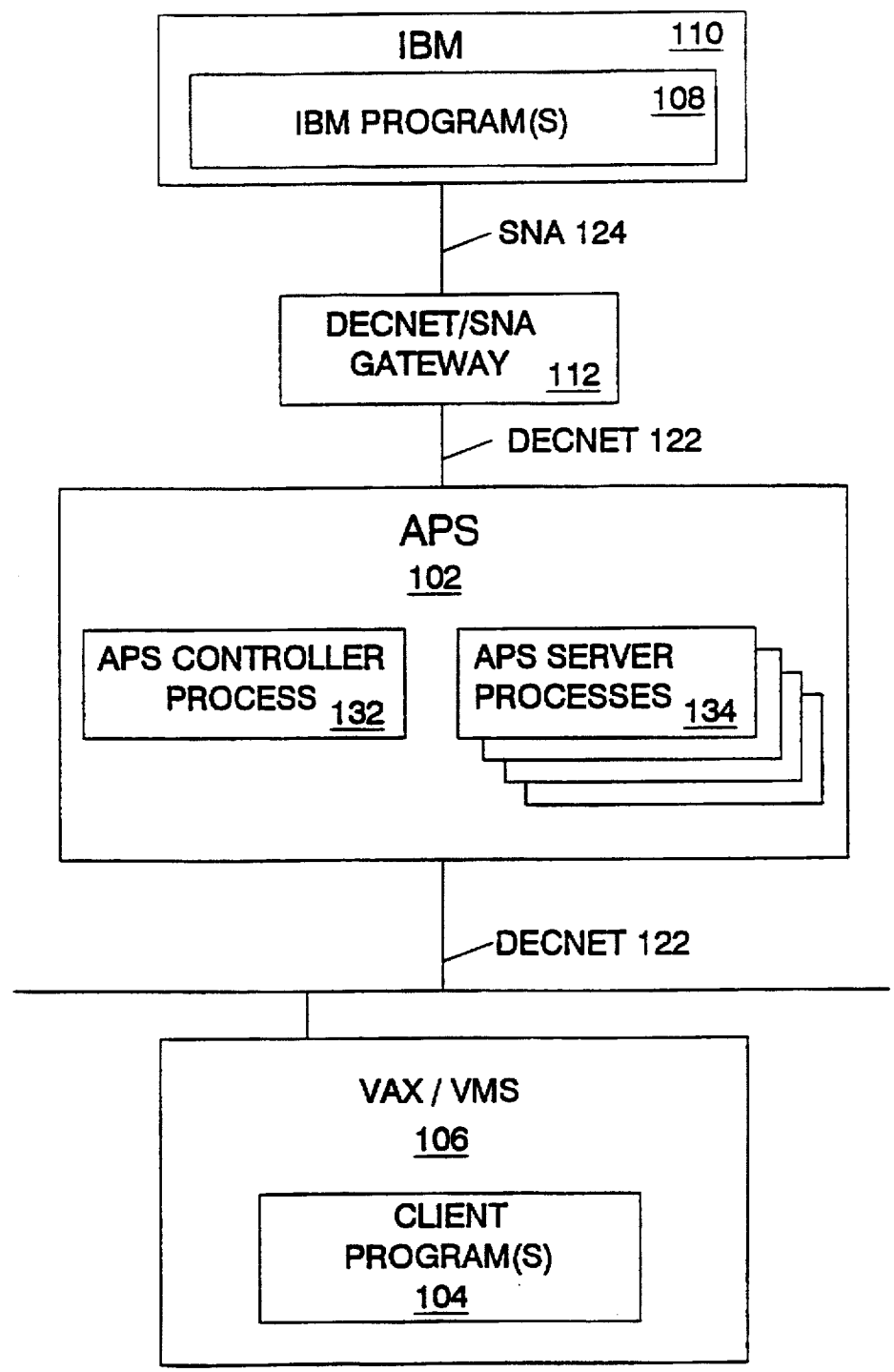
FIG. 1 is a high-level block diagram of the APS according to the present invention and its surrounding environment.

A high-level block diagram of the APS system and its environment is illustrated in FIG. 1. Referring now to FIG. 1, APS 102 provides a session whereby APS client programs 104 running in a VAX/VMS environment 106 communicate with IBM programs 108 (such as LU6.2 programs) running in an IBM environment 110 (e.g., one or more IBM mainframes). APS 102 allows multiple APS client programs 104 running on one or more VAXes 106 to communicate with one or more IBM programs 108 running in one or more IBM machines.

A DECnet/SNA gateway 112 provides the interface between a DECnet 122 communications environment and an IBM SNA 124 communications environment. Gateway 112 is illustrated in FIG. 1 and in subsequent FIGs. as a separate "box." It should be noted that this separation of gateway 112 from APS 102 is a functional separation and not necessarily a logical or physical separation. In other words, gateway 112 and APS 102 can execute on the same processor. All functions of gateway 112 can be performed by the same machine that executes APS 102 functions, thus obviating the need for a separate physical gateway 112.

Gateway 112 handles conversions necessary to go from one set of protocols to another. A message format conversion converts messages to an appropriate format and size for the computing environment which the message is entering. An address translation translates the addresses associated with a message to the address structure required by the destination network. A protocol conversion replaces control information from one computing environment with control information required to perform comparable functions in the other environment. This conversion typically allows for services such as message segmentation and reassembly, data flow control, and error detection and recovery.

An APS controller process 132 is the heart of APS 102. APS controller process 132 manages other APS server processes 134 within APS 102. APS server processes 134 handle IBM links through LU6.2. DECnet sessions are established and utilized by APS controller process 132 and by each APS server process 134. APS server processes 134 are managed by APS controller process 132 and are used to establish the communications sessions between APS client programs 104 and programs 108.

2. APS System Primary Functions

APS 102 supplies communications services between IBM programs 108 and client programs 104. Because these services are designed to be transparent to the programs, neither IBM programs 108 nor client programs 104 are "aware" that they are communicating via an intermediary APS system 102. Each program 108, 104 uses its own local communications facilities (e.g., CICS statements or CPI-C routines to the IBM. The VAX uses APS client routines which are CPI-C compliant).

APS 102 provides session multiplexing functionality. This functionality facilitates the use of an LU6.2 session with an IBM 110 by a large number of different client programs 104 over a given period of time. Conversations with an IBM program 108 occur in a sequential manner such that a first conversation between a first client program 104 and an IBM program 108 is fully terminated before the next conversation between a subsequent client program 104 and the same IBM program 108 is initiated. In this regard, one of the key primary functions of APS 102 is that the LU6.2 sessions are permanent sessions which are not re-established as IBM 110 has conversations with more than one client program 104. In other words, the number of LU6.2 sessions is predetermined before booting up the gateway. The number of LU6.2 sessions remains fixed, or set, at the predetermined number as long as the system is running. Logically re-booting the APS application functional logic and manually altering the defined number of sessions are the only ways in which the number of sessions can be changed. This enables more accurate system balancing and tuning of IBM 110 because the operating system is not frequently diverted to the task of managing a variable session load or to the periodic and time-consuming task of managing LU6.2 connects and disconnects.

Another key function, derived from this multiplexing functionality, is that the LU6.2 session can be used and shared by multiple VAX clients 106. As a result, each client system 106 does not need to devote the resources and time to the task of establishing the LU6.2 sessions in order to facilitate a conversation with an IBM program 108. A second benefit which accrues to clients 106 is derived from the rapid feedback indicating full utilization of existing LU6.2 sessions to a particular IBM 110 machine for a particular application. Such feedback can be used as a feedback event to query for another IBM 110 machine or to redirect resources to another task on client system 106.

By limiting the number of sessions that are active for any particular IBM 110, client systems 106 are afforded rapid response from the IBM 110 when they are connected. An additional key function provided by APS 102 is transparent failover to alternative APS 102 interfaces at the time of conversation initiation so that an IBM program 108 can be reached via an alternative path without the need for the client application program 104 to facilitate the initiation of a link to an alternative APS 102.

The alternative path can be another APS 102 which could use another gateway 112 to reach the IBM. Note that a large number of alternative APS 102 can be defined.

Transparent failover can be provided for the IBM side as well. This feature is enabled by defining permanent LU sessions from multiple APSs 102 to the same IBM program 108 (see FIG. 6 for an example). That is, the number of LU sessions is predetermined and remains fixed at the predetermined number of sessions. The number of sessions can only be changed deliberately, not automatically. The term "fixed" is defined herein and in the claims to mean that the number of LU sessions remains unchanged during a real time period. The real time period initiates with either (1) a logical booting of the executable APS application functional logic, or, alternatively, (2) with a modifying input from a human operator which changes a data value defining the number of LU sessions. The real time period terminates with either (1) the logical shutdown of the executable APS application functional logic, or, alternatively, (2) with a modifying input from a human operator which occurs subsequent to the initiation of the real time operation period which changes the data value defining the number of LU sessions. If the DECnet path from one APS 102 to a client 106 should not be available, or the APS 102 itself is unavailable, another APS 102 may be used to reach the client system 106. The functionality for selecting an alternative APS 102 needs to be built in each IBM program 108 if desired.

Another failover function provided by APS 102 is that the APS server processes 134 can try to establish their LU sessions via another gateway 112 or via an alternative LU on the same gateway 112 in case they are not able to establish their LU session through their primary LU on gateway 112.

APS 102 also provides means by which IBM program 108 can establish a conversation with a client program 104 resident on any client system 106 (with installed APS client routines and DECnet routines) via DECnet 122. When an IBM program 108 requests a conversation with a client program 104 via APS 102, APS 102 triggers the requested client program 104 via DECnet 122.

A further primary function of APS 102 is to provide and enable a group of essentially simultaneous conversations to be established wherein a program in one environment can have conversations with multiple programs resident in the other environment. These sessions can be directed toward a single client program 104 or to several client programs 104 on one or more VAX 106 machines. Similarly, APS 102 can keep several sessions open to one or more IBM programs 108 in one or more IBM 110 machines.

Several alternative embodiments can be implemented to enable the multiple session scenarios. In one embodiment, a client program 104A can establish many individual conversations with IBM 110 via APS 102. For each conversation established, one DECserver process 206 is designated to enable the sessions necessary for the conversation.

In an alternative embodiment, an IBM program 108 can request a conversation via an IBM server process 208 to a client program 104. The client program 104 then further establishes individual conversations with IBM 110 via APS 102 using DECserver processes 206. For each individual conversation established, one APS server process 134 is designated to enable the necessary sessions.

In an additional alternative embodiment, a single IBM program 108 could request a group of conversations with different client programs 104B by using a group of affiliated IBMserver processes 208 to connect to the different client programs 104B. For each individual conversation established in this scenario, one IBMserver process 208 is designated to enable the sessions necessary for that conversation.

For each of these embodiments, it should be noted that an APS client program 104 can have only one active session requested by an IBM program 108 at one time.

In all cases, APS 102 connects to an available LU session at the request of a client program 104 through the use of a single DECserver process 206 which will be solely dedicated to facilitating that conversation until that conversation is terminated. Also, APS 102 connects to a client program 104B at the request of an IBM program 108 through the use of a single IBMserver process 208 which will be solely dedicated to facilitating that conversation until that conversation is terminated. However, in one embodiment, an APS client program 104 can have only one active session requested by an IBM program 108 at one time.

APS 102 provides logging and control functionality as well. APS 102 logs all of its activities and generates system alerts if problems arise. Also, statistical data is gathered and compiled by APS 102.

One additional function provided by APS 102 is character translation. VAX systems communicate using American Standard Code for Information Interchange (ASCII) which is a seven-bit character code. IBM, on the other hand, uses an eight-bit code known as EBCDIC (extended binary character decimal interchange code). Therefore, exchanging character data between the IBM and the VAXes may require character translation. Off-the-shelf products are available for the VAX to support an ASCII to/from EBCDIC conversion. However, these products only support standard character sets. APS 102 provides a conversion feature to provide character translation to a broad range of characters including multi-national or other characters. Therefore, programs 104, 108 need not perform character translation to conform to their communication partners.

3. Functional Description of the APS

Figure 2:
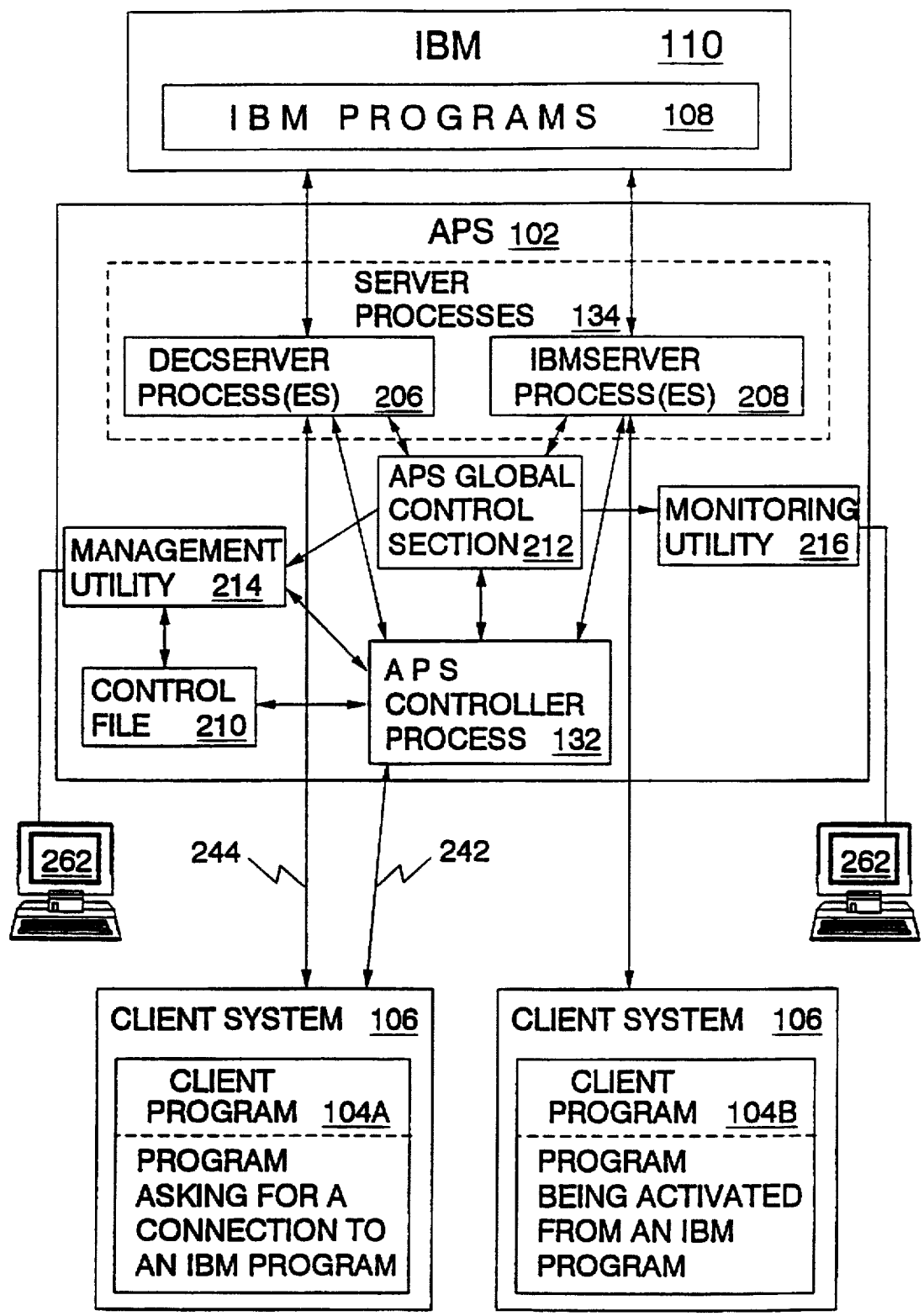
FIG. 2 is a functional block diagram illustrating the functionality of the APS according to the present invention.

FIG. 2 is a functional block diagram illustrating the functionality discussed above and additional functionality of APS 102. Referring to FIG. 2, APS controller process 132 is the heart of APS 102. APS controller process 132 manages all other APS processes 134 and has its own DECnet sessions.

According to a preferred embodiment, APS controller process 132 is a permanent DECnet process, supporting multiple logical DECnet sessions. Two types of server processes 134 are provided in the preferred embodiment. These are DECserver processes 206 and IBMserver processes 208. In alternative embodiments, other server processes 134 may be provided depending on the computing environments to be interfaced and their associated communications protocols, standards and routines.

According to one embodiment, server processes 134 are created at start-up of APS 102. If more sessions are required such that additional server processes 134 are required, a management utility 214 is provided to allow a user to create the additional server processes 134. Alternative embodiments may be contemplated including an embodiment wherein APS controller process 132 creates additional server processes 134 when needed or deletes server processes 134 when an excessive amount is present.

In a preferred embodiment, server processes 134 are class-specific processes. In other words, server processes 134 point to specific IBM programs 108 or to a specific type of IBM program 108. For example, suppose a purchasing and order system is an IBM program 108 with which a client program 104 wishes to communicate. A specific server process 134 class is established to communicate with that program and a specific server process 134 within that class is used to establish a session with the purchasing and order system. To accommodate a class type of system, several server processes 134 for each type of class (that has an anticipated use) will be established so that they are available when a client program 104A makes a request.

Two types of client programs 104A, 104B are illustrated for purposes of describing the functionality of APS 102. Client program 104A is a VAX program that is requesting connection to an IBM program 108. Client program 104B is a VAX program that is activated by an IBM program 108 requesting connection. Although FIG. 2 depicts only two client programs 104 on two client systems 106, according to the present invention multiple programs 104 resident on one or more client systems 106 can communicate with programs in one or more IBM systems. For example, one client system might be a VAX cluster, and a second client system might be an Alpha system. A client system can also be a mixed cluster of VAX and Alpha machines. Any of these client systems or combinations thereof can be supported simultaneously using the present invention.

The APS server and the client software can run on the same machine, if desired. This way, it is possible for the APS server and the client can use each other's services.

A given number of logical unit sessions with the IBM programs 108 (established by server processes 134) are maintained at all times. This number is predetermined (i.e., established before boot-up of the APS application functional logic or by manually altering the predetermined number), and this number remains fixed (i.e., the number does not change except for logical re-boot of the APS application or manual input). One logical unit session is used by one server process 134 to allow a client program 104A to communicate with an IBM program 108. Established logical unit sessions can also be used by IBM programs 108 to communicate with client programs 104B. Having logical unit sessions established in advance provides a performance advantage because client programs 104A do not have to wait for an LU6.2 session to be established by DECserver process 206 when service is requested.

Because system and network limitations will likely limit the number of available server processes 134, a situation may arise where a server process 134 is not available to support a requesting program (either a client program 104A or an IBM program 108). In this situation, requesting program 104A, or 108 will have to wait until a server process 134 becomes available. In a preferred embodiment, an APS client routine 922 (FIG. 9) attempts connection via another APS 102 if one is available.

To enable IBM program 108 to initiate a conversation with a client program 104B, a logical unit session must already be established by an IBM server process 208.

A management utility 214 provides an interface that allows operator control of APS 102 via a terminal 262. Some of the capabilities provided by management utility 214 are to allow operators to create additional server processes 134 and allow operators to manage APS 102 processes and functions.

A monitoring utility 216 is provided to pull data from control section 212, format the data into reports and screens, and send the formatted data to a terminal 262. This allows a human operator to monitor the operation of APS 102. Note that monitoring utility 216 could be implemented as a subset or subsystem of management utility 214.

A control section 212 serves as the main working area for APS 102. Control section 212 also serves as a store for global data and makes this data available to server processes 134, management utility 214, monitoring utility 216, and to APS controller process 132. Additionally, a control file 210 is provided wherein APS 102 stores permanent definitions.

It should be noted that the architecture depicted and described with respect to FIG. 2 was chosen to best illustrate the functionality of the present invention. Numerous alternative physical and/or logical architectures could be chosen to implement the desired functionality. It would be apparent to a person skilled in the relevant art how such alternative architectures would be implemented.

Figure 3:
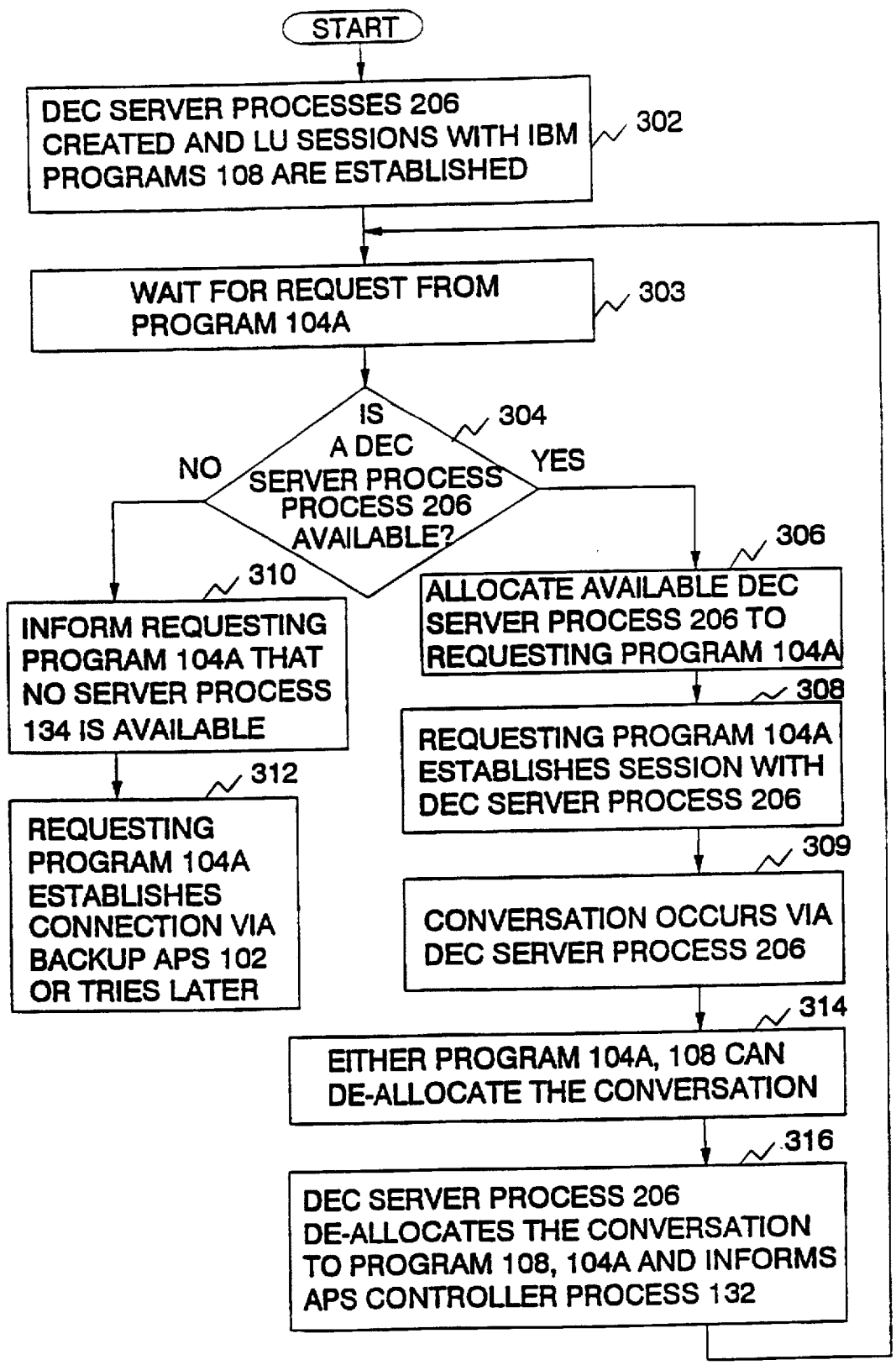
FIG. 3 is a flow chart illustrating a method for interfacing client programs in a first computing environment to programs in a second computing environment.

A method for interfacing a client program 104A to an IBM program 108 through DECserver process 206 is depicted in FIG. 3. Referring now to FIGS. 2 and 3, this method will now be described. This description is provided in terms of client program 104A in a first computing environment requesting connection to program 108 in a second computing environment.

In a step 302 when APS 102 is started, a specified number of DECserver processes 206 are created. The number of DECserver processes 206 created is chosen based on projected link requirements, and the number of those are defined in control file 210. Enough are created so that there is typically a DECserver process 206 available when a program 104A, requests a connection to a program 108. For each DECserver process 206 created, a logical unit session is established with an IBM program 108.

In a step 303, DECserver process 206 waits for a service request. When a service is requested by a program 104A, APS controller process 132 receives the request from program 104A. This request is made via an interactive session 242. This interactive session 242 is active during the time that client program 104A is requesting a session.

In a step 304, APS controller process 132 determines whether a DECserver process 206 is available. Note, in a system using classes of DECserver processes 206, the real determination is whether a DECserver process 206 of the correct class to handle the desired session is available. If a DECserver process 206 is available, it is allocated to requesting program 104A by APS controller process 132 in a step 306. Also in step 306, APS controller process 132 assigns a unique session ID, informs the designated DECserver process 206 of the ID, and sends connection information to requesting program 104A. At this time, interactive session 242 is terminated.

In a step 308, requesting program 104A establishes a session 244 directly with the designated DECserver process 206. In a step 309, the conversation between client application 104A and IBM program 108 occurs via the specified DECserver process 206. Requesting program 104A, begins transmitting data to specified program 108 in the second computer environment. Once the session is established, APS controller process 132 is not actively involved in the communication between requesting program 104A, and specified program 108.

While the conversation established in step 309 is active, APS 102 performs all data conversions necessary to allow requesting program 104A to communicate with specified program 108. For example, APS 102 receives data from requesting program 104A via DECnet. When this data is transmitted to specified IBM program 108, it is transmitted using APS LU6.2 routines that provide communications compatible with the IBM environment. In this scenario, a character conversion from ASCII to EBCDIC can be performed by APS 102 as well.

When the communication is completed, either program can de-allocate the conversation through DECserver process 206 in a step 314. In response, in a step 316, DECserver process 206 de-allocates the conversation to program 108 (or to client program 104A) and informs APS controller process 132 that it is ready to accept a new conversation request. Note that DECserver process 206 can also terminate either session. Once the conversation and the DECnet session are terminated, DECserver process 206 returns to the status indicated in step 303.

If, in step 304, APS controller process 132 determines that no DECserver process 206 is available to handle the requested session, APS controller process 132 informs requesting program 104A in a step 310. In a step 312, requesting program 104A tries to connect via a backup APS 102 if one or more backup APS 102 are available. According to a preferred embodiment, client routines 922 (FIG. 9) must initiate the operation of looking for another APS 102.

The method described above with respect to FIG. 3 will now be further illustrated by way of a specific example. When a connection to an IBM program 108 is requested by a VAX client program 104A, APS controller process 132 looks for an available DECserver process 206 of the appropriate class. If a DECserver process 206 is available, APS controller process 132 allocates it to the requesting client program 104A, assigns a unique session ID, notifies the DECserver process 206 of the ID, and sends connection information to requesting client program 104A. Requesting client program 104A then establishes a DECnet session directly with the designated DECserver process 206. In response, the DECserver process 206 establishes a conversation with specified program 108 and program 104A communicates with program 108 by way of that DECserver conversation.

When client program 104A has completed its communication, it disconnects the DECnet session to DECserver process 206. DECserver process 206 deallocates the conversation to IBM program 108, and informs APS controller process 132 that it is ready to accept a new conversation request. If IBM program 108 terminates the conversation, DECserver process 206 terminates the session to client program 104A.

Additionally, the DECnet session and the LU session to DECserver process 206 can be disconnected by DECserver process 206. This happens in the event of an error.

Figure 4:
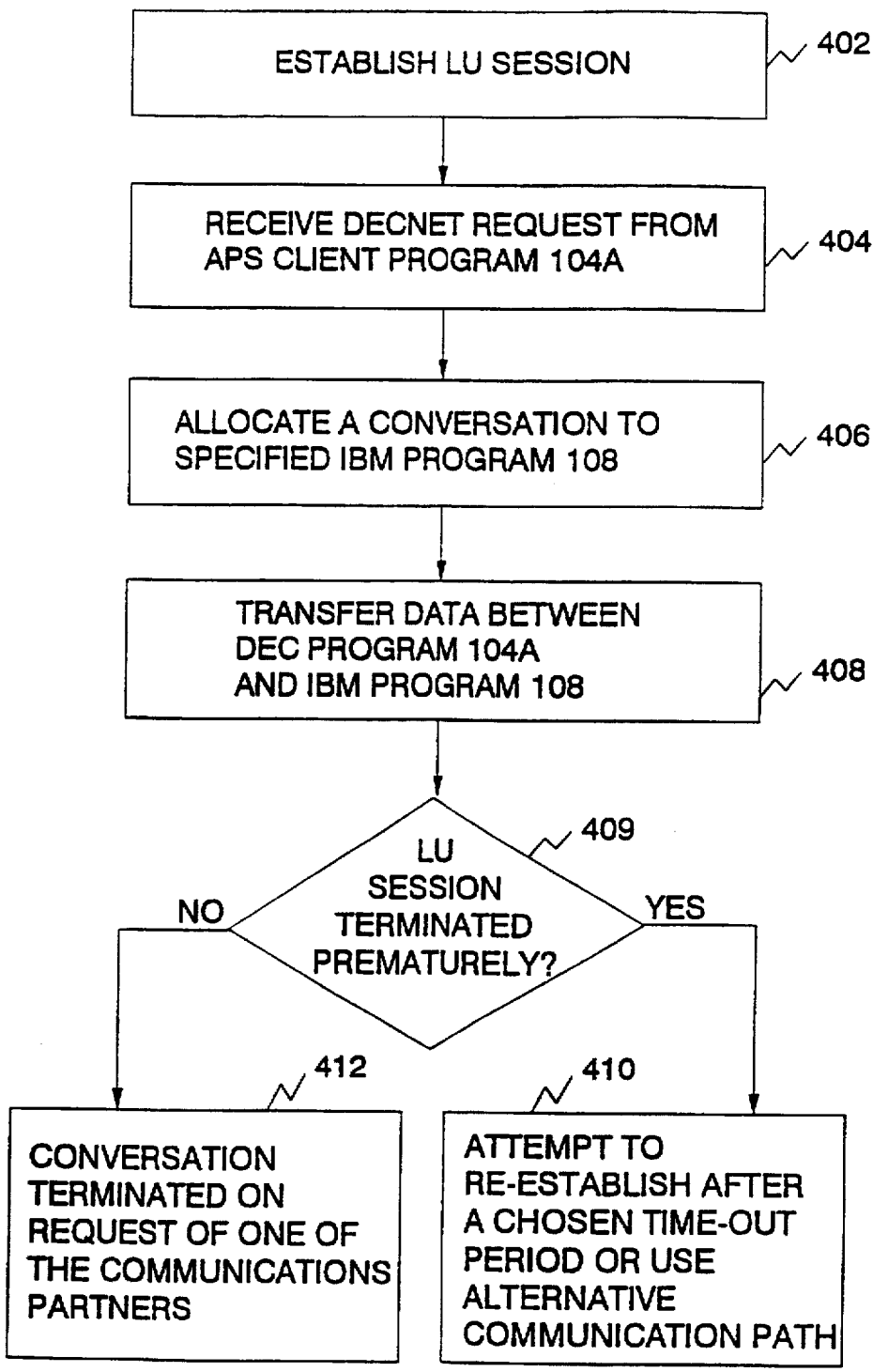
FIG. 4 is a flow chart illustrating the specific example of a DECserver process establishing and implementing a session with a specified IBM program.

As discussed above, in step 309 DECserver process 206 establishes a conversation with the specified IBM program 108. FIG. 4 is a flow diagram illustrating the steps followed by DECserver process 206 in establishing, maintaining and terminating this connection. FIG. 4 is discussed in terms of DECserver process 206 establishing a session and facilitating a subsequent conversation with a specified IBM program 108. Based on the following discussion, it would be obvious to a person skilled in the relevant art how the method discussed with respect to FIG. 4 also applies to the more general case of a server process establishing a communication for a program in a first computing environment to communicate to a program in a second computing environment.

Referring now to FIGS. 1, 2 and 4, in a step 402, DECserver process 206 establishes an LU session to specified IBM program 108. In one embodiment, this session is initially established at the start-up of APS 102 and subsequently at the startup of each server process 134.

In a step 404, DECserver process 206 receives a DECnet connection request from APS client program 104A following the initial interaction with APS controller process 132. Client program 104A is requesting connection to a specified IBM program 108. In a step 406, in response to this request, a conversation is allocated to specified IBM program 108.

Now that the necessary connections are established, data is transferred between client program 104A and IBM program 108 in a step 408. This transfer takes place independently of APS controller process 132. To accomplish this transmit, APS 102 uses APS DECnet routines to transfer data with client program 104A via DECnet 122. APS 102 also uses APPC/LU6.2 routines to transfer data to a specified IBM program 108. Alternative embodiments may be considered wherein other routines are used to retrieve and/or transmit data to/from other computing environments.

If the LU6.2 session terminates prematurely (box 409), server process 134 attempts to re-establish the LU6.2 session in a step 410. In a preferred embodiment, the attempts are made periodically after a specified time-out period. The operation of re-establishing a necessary LU6.2 session is transparent to the user of client program 202A. The time-out period is chosen so that server process 134 has the opportunity to reestablish communications without expanding system resources indefinitely. But, if an LU6.2 session is lost, DECserver process 206 terminates the session to client program 104A and both sessions will need to be re-established before a conversation can be re-initiated. Note, in this case, DECserver process 206 must re-establish the LU6.2 session prior to being available for other sessions to client programs 104A. Client program 104A must periodically query for the re-established DECserver process 206 or seek an alternative DECserver 206 process.

If a session between client program 104 and server process 134 is lost, the conversation to IBM program 108 will be terminated. However, the LU6.2 session to IBM program 108 will not be terminated, because, as described above, the number of LU6.2 sessions remains fixed. The affected DECserver process 206 will be available for the next requesting client program 104.

If the session does not terminate prematurely, DECserver 206 terminates the conversation at the request of either client program 104A or IBM program 108 in a step 412. Either IBM program 108 or VAX client program 104A may terminate the conversation as well.

A second example will now be described to illustrate what occurs when an IBM program 108 requests connection to a VAX program 104B. Because the LU (logical unit) session must have been established by APS 102, connection requests by an IBM program 108 can only occur on active LU sessions. IBMserver process 208 keeps track of its established session and waits until an IBM program 108 requests a conversation. When this occurs, IBMserver process 208 establishes a DECnet session to the specified client program 104B. Once this session is active, both the IBM program 108 and the client program 104B can send and receive data and status messages (i.e., they can carry on a conversation over the sessions). Additionally, both IBM program 108 and VAX program 104B can de-allocate the conversation. When this occurs, IBMserver process 208 leaves the LU session active and waits for another conversation request.

Figure 5:
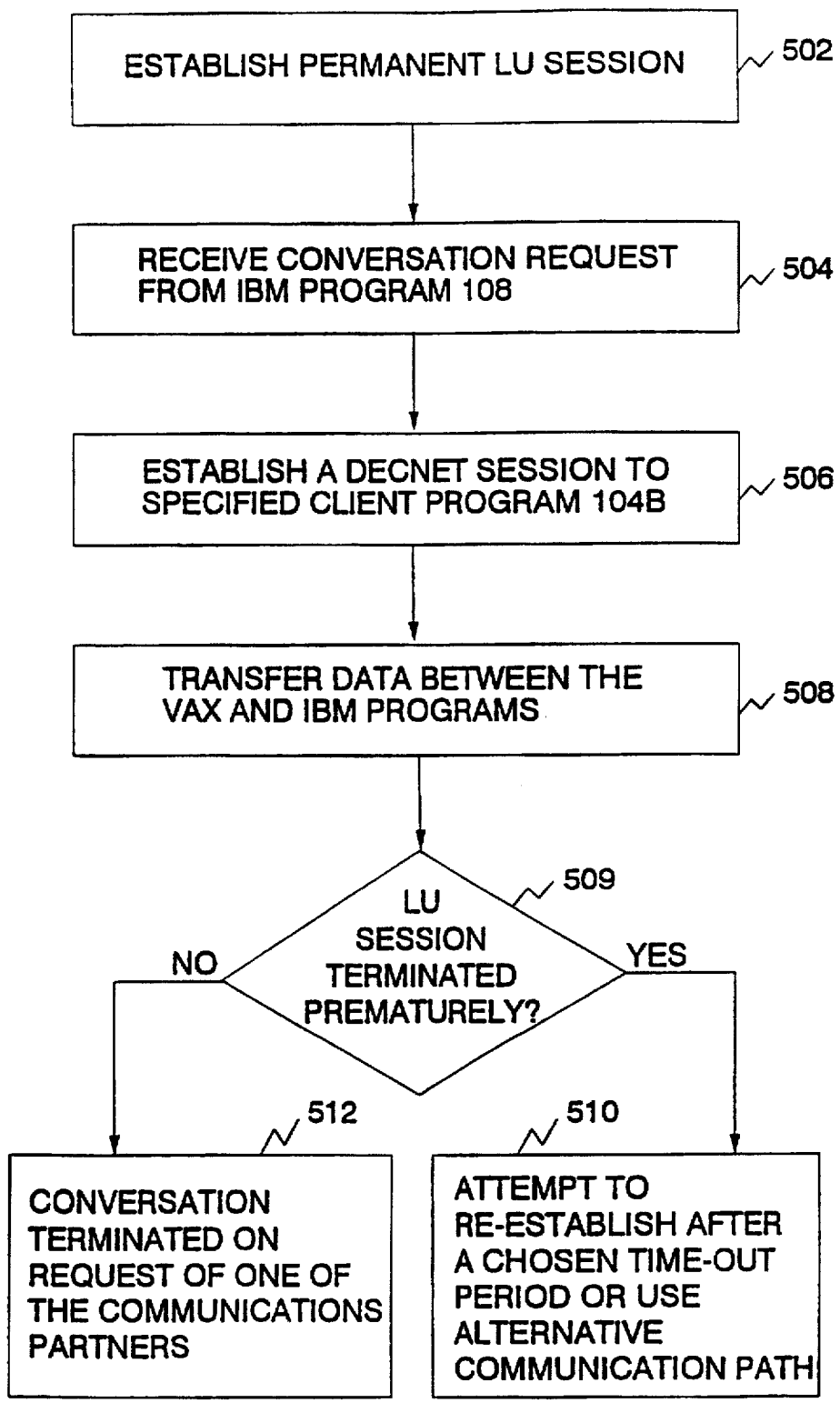
FIG. 5 is a flow chart illustrating the specific example of an IBMserver process establishing and implementing a session with a specified client program.

The process followed by IBMserver process 208 in connecting IBM program 108 to client program 104B according to a preferred embodiment, will now be described. FIG. 5 is a flowchart illustrating the method followed by IBMserver process 208 in establishing such a connection. Referring now to FIGS. 1, 2 and 5, in a step 502, IBMserver process 208 establishes a permanent LU session to IBM program 108.

In a step 504, IBMserver process 208 receives a request from IBM program 108 for connection to client program 104B. In a step 506, IBMserver process 208 establishes a DECnet session to the specified client program 104B.

Once the conversation is established, transfer of data and statuses can occur between IBM program 108 and client program 104B in a step 508. This transfer takes place independently of APS controller process 132. IBM server process 208 performs communications and/or protocol conversions necessary to transfer data between requesting IBM program 108 and specified client program 104B. In a preferred embodiment, APPC/LU6.2 routines are used to transfer data with IBM program 108, and DECnet routines are used to transfer data via DECnet 122 with specified client program 104B. Alternative embodiments may be considered wherein other communications routines are used to transfer data between requesting program 108 and specified program 104B.

If the LU6.2 session terminates prematurely (box 509), IBMserver process 208 attempts to re-establish the LU6.2 session in a step 510. In a preferred embodiment, the attempts are made periodically after a specified time-out period. The operation of re-establishing a necessary LU6.2 session is transparent to the user of client program 104B. The time-out period is chosen so that IBMserver process 208 has the opportunity to reestablish communications without expanding system resources indefinitely. But, if an LU6.2 session is lost, IBMserver process 208 terminates the session to client program 104B and both sessions will need to be re-established before a conversation can be re-initiated. Note, in this case IBMserver process 208 must re-establish the LU6.2 session prior to being available for other sessions to client programs 104B.

IBM program 108 must periodically query the re-established IBMserver process 208 or seek an alternative IBMserver process 208.

If the session does not terminate prematurely, in a step 512, IBMserver process 208 terminates the communication link at the request of either IBM program 108 or client program 104B, leaving the LU session established.

4. Environment of the APS

Figure 6:
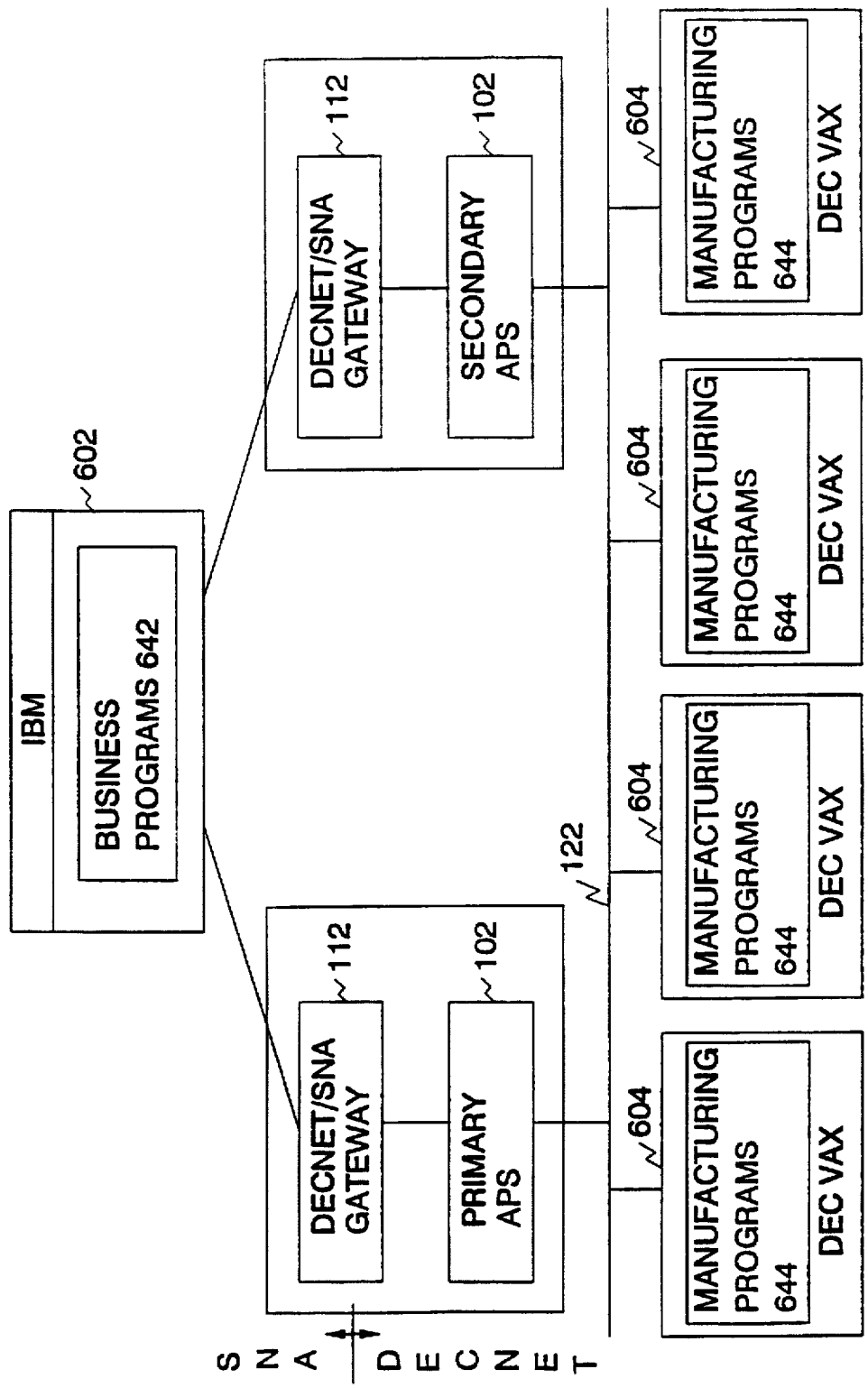
FIG. 6 is a block diagram illustrating an example implementation of the APS according to the present invention.

The primary function of APS 102 is to provide a communications interface between programs running in different computing environments. To help illustrate this functionality further, APS 102 will be discussed in terms of an example APS environment in which programs running in two different computing environments can communicate via APS 102. FIG. 6 is a block diagram illustrating the use of APS 102 in an example environment. Referring now to FIG. 6, this environment and the role played by APS 102 therein will be described. Note that the environment depicted is merely one example of the numerous environments in which APS 102 may be implemented.

An IBM mainframe 602 (or other system that can implement APPC) runs business programs 642 to manage the business aspects of a company that manufactures and sells a product. Business programs running on the IBM mainframe perform functions such as inventory calculation, order scheduling, customer billing, and the like.

A plurality of DEC VAXes 604 are used to control manufacturing of the company's products. Manufacturing programs 644 running on VAXes 604 interface to and monitor the manufacturing process.

In order to integrate the computerized business environment of the company with the computerized manufacturing environment, it is necessary that the business programs 642 communicate with the manufacturing programs 644. Conventional wisdom dictates that to achieve such communication, a DECnet/SNA gateway 112 be provided to interface IBM mainframe 602 with DEC VAX 604.

Also, according to conventional wisdom, for each VAX 604 to be interfaced, separate DECnet/SNA VMS APPC/LU6.2 routines are required for each VAX 604. For large plants having numerous manufacturing production or process-control VAXes 604, the conventional solution requires multiple copies of these routines. This can lead to difficulties from a management perspective, as discussed in the background section of this document. This can also lead to an inefficient use of network resources.

According to the present invention, APS 102 interfaces multiple VAXes 604, or other DECnet systems, via a single gateway 112. In a preferred embodiment, a second APS 102 is also furnished to provide the environment with redundancy and additional capacity. A box is drawn around each pair of gateway 112 and APS 102 to illustrate that the gateway functionality could be included in APS 102.

Figure 7:
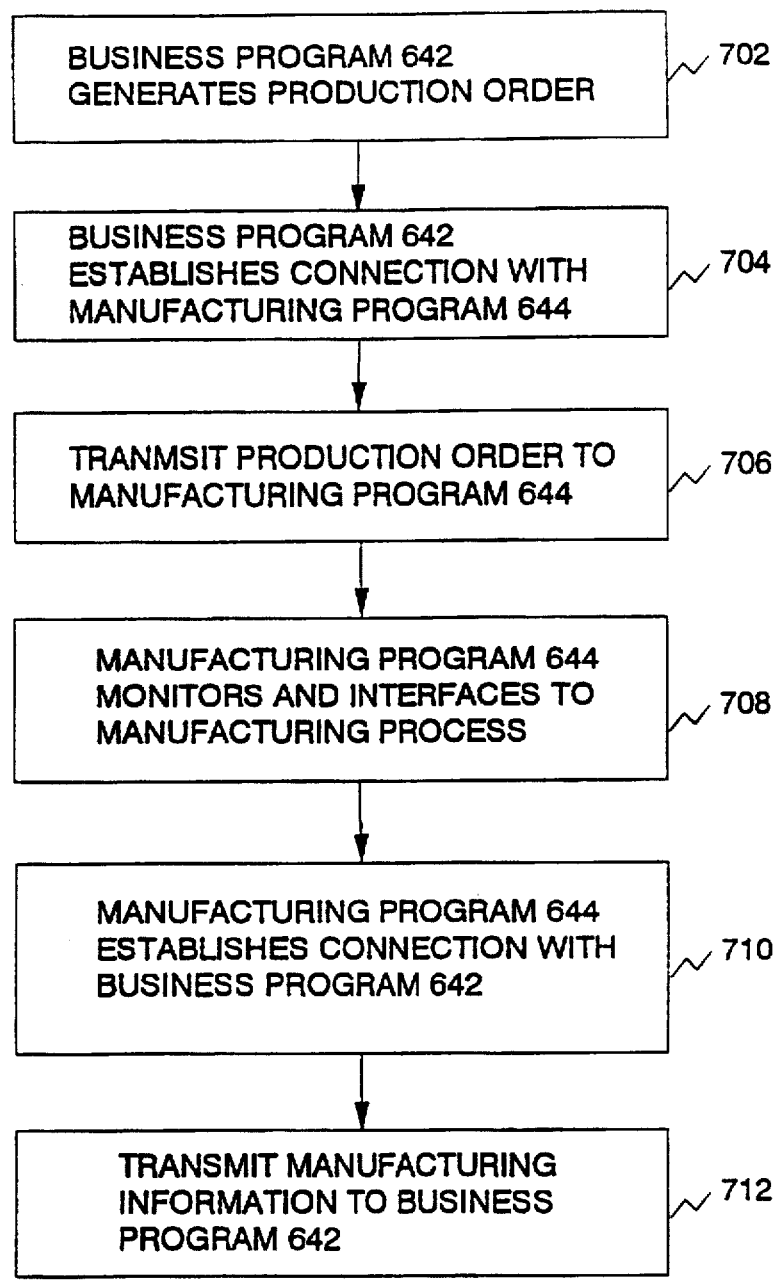
FIG. 7 is a flow chart illustrating a scenario in which programs in a business environment use the APS to communicate with programs in a manufacturing environment.

APS 102 in this environment will be further described through the use of a simple scenario. In this scenario, business programs 642 generate a production order request in response to a product order. This production order request is to be communicated to manufacturing programs 644 on VAX 604 so that the product can be produced in the manufacturing environment. In response, manufacturing program 644 will need to communicate with business program 642 to report changes in inventory based on raw materials used and products produced, and to report other production-related data. FIG. 7 is a flowchart that will be used to illustrate the steps involved in carrying out this scenario.

Referring now to FIGS. 6 and 7, in a step 702, business program 642 running on IBM mainframe 602 generates a production order and wishes to transmit it to manufacturing program 644 running on VAX 604. In step 704, business program 642 establishes a connection with manufacturing program 644. According to conventional wisdom, using a DECnet/SNA gateway 112 interfaced directly to a VAX 604, this could not be accomplished because business program 642 could not establish a connection to VAX 604. However, according to the present invention, because APS 102 has already established an LU session with IBM mainframe 602 via gateway 112, business program 642 can establish a conversation with manufacturing program 644, as discussed above with respect to FIG. 5.

Once this connection is established, business program 642 transmits the production order to manufacturing program 644 in a step 706. Again, this transfer is conducted in accordance with the methods discussed with respect to FIG. 5. Upon receipt of the production order, manufacturing program 644 carries out the production of the requested product in a step 708.

Manufacturing program 644 now would like to communicate production information to business programs 642. This information includes information such as raw materials used and quantity of products produced. To communicate this information, manufacturing program 644 establishes a connection with business program 642 via APS 102 in a step 710. This is accomplished by APS 102 establishing connection to business programs 642 as discussed above with respect to FIG. 4. In a step 712, production program 644 sends the inventory and production information to business programs 642 via APS 102.

Note that through the use of APS 102, multiple communication links can be established to allow communications between multiple manufacturing programs 644 and multiple business programs 642. Also, APS 102 allows business programs 642 to initiate a communication transaction with any one of multiple manufacturing programs 644. This second feature provided by APS 102 was previously unavailable using the conventional wisdom of gateway 112 (except for some limited capability if a prior link with a gateway by a client had been established by the client).

Also note that in this environment, DEC VAXes 604 are configured as clients to APS 102. As illustrated in FIG. 6, communications between APS 102 and client VAXes 604 is via DECnet 122. Communications between gateway 112 and IBM mainframe 602 are via IBM communications protocol SNA.

5. Controller Process/Server Process Communication

Figure 8:
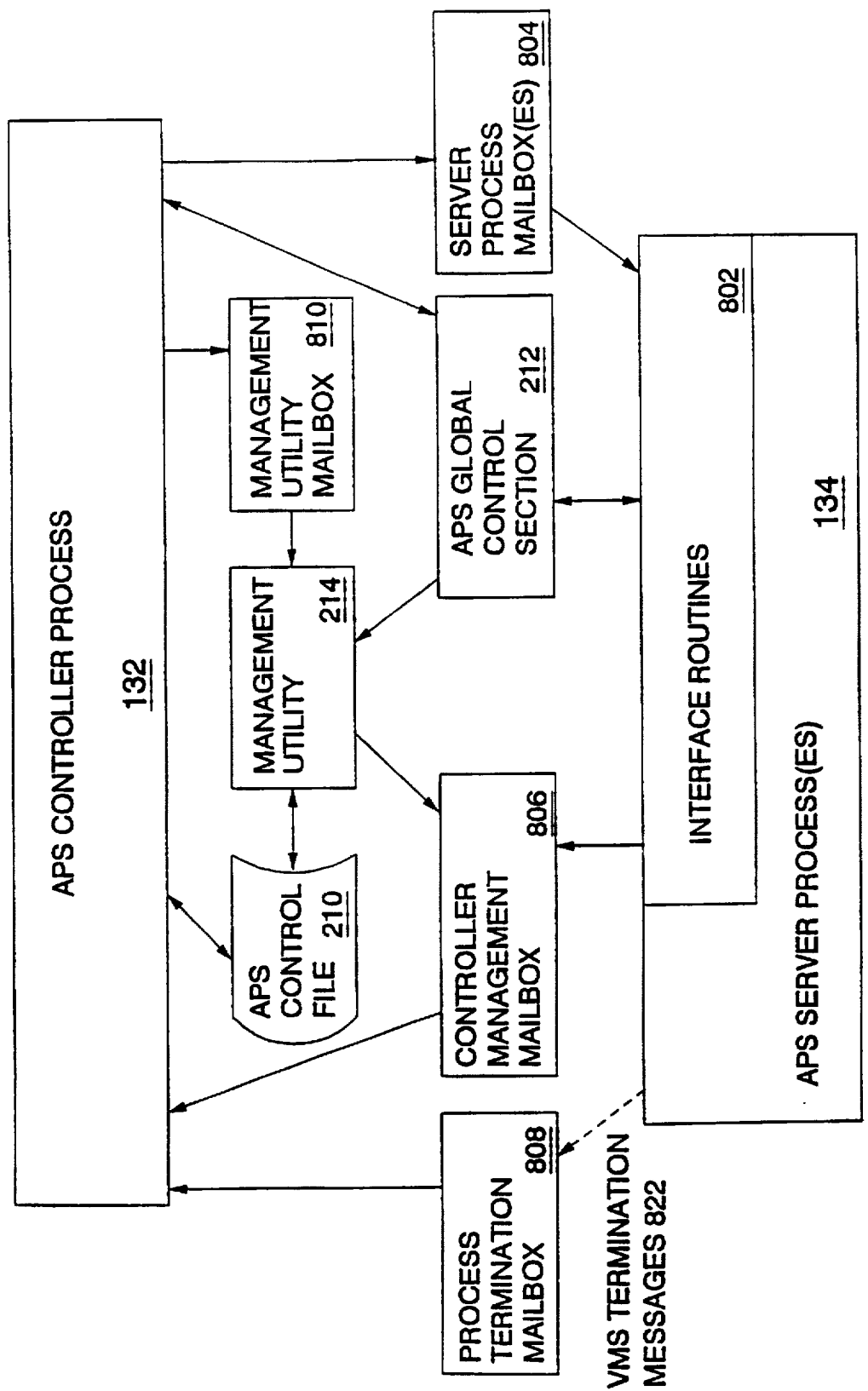
FIG. 8 is a block diagram illustrating internal interfaces between an APS controller process and APS server processes.

Communications between APS controller process 132 and server processes 134 are illustrated in FIG. 8. Interface routines 802 are provided to enable server processes 134 to communicate with APS controller process 132. Several mailboxes 804, 806, 808, 810 are provided to facilitate exchange of messages, commands, and requests between APS controller process 132 and server processes 134. There is one server process mailbox 804 for each APS server process 134. Server process mailboxes 804, and controller management mailbox 806, allow a synchronous operation of controller process 132 and server processes 134. Messages, commands, and requests can be deposited in mailboxes, 804, 806 and at any time and retrieved and processed by the destination process 132, 134 at a later point in time.

Server process mailbox 804 stores commands and messages sent by controller process 132 and forwards them to server processes 134. Such messages can include information such as the session ID, and other connection information.

A controller management mailbox 806 is provided to store messages from APS server processes 134 and from management utility 214. These messages are then forwarded to controller process 132. An example of these messages are request to retrieve information from control file 210. APS controller process 132 communicates to management utility 214 via a management utility mailbox 810.

A process termination mailbox 808 stores termination messages 822 generated by VAX/VMS regarding termination of a server processes 134 and forwards them to controller process 132. Such termination messages are created when a server process dies or exits. Controller process 132 acts on this by recreating terminated server process 134. VMS termination messages 822 are illustrated using a dashed line to illustrate that they actually come from VMS and not from server process(es) 134.

6. Client-Server Connection

Figure 9:
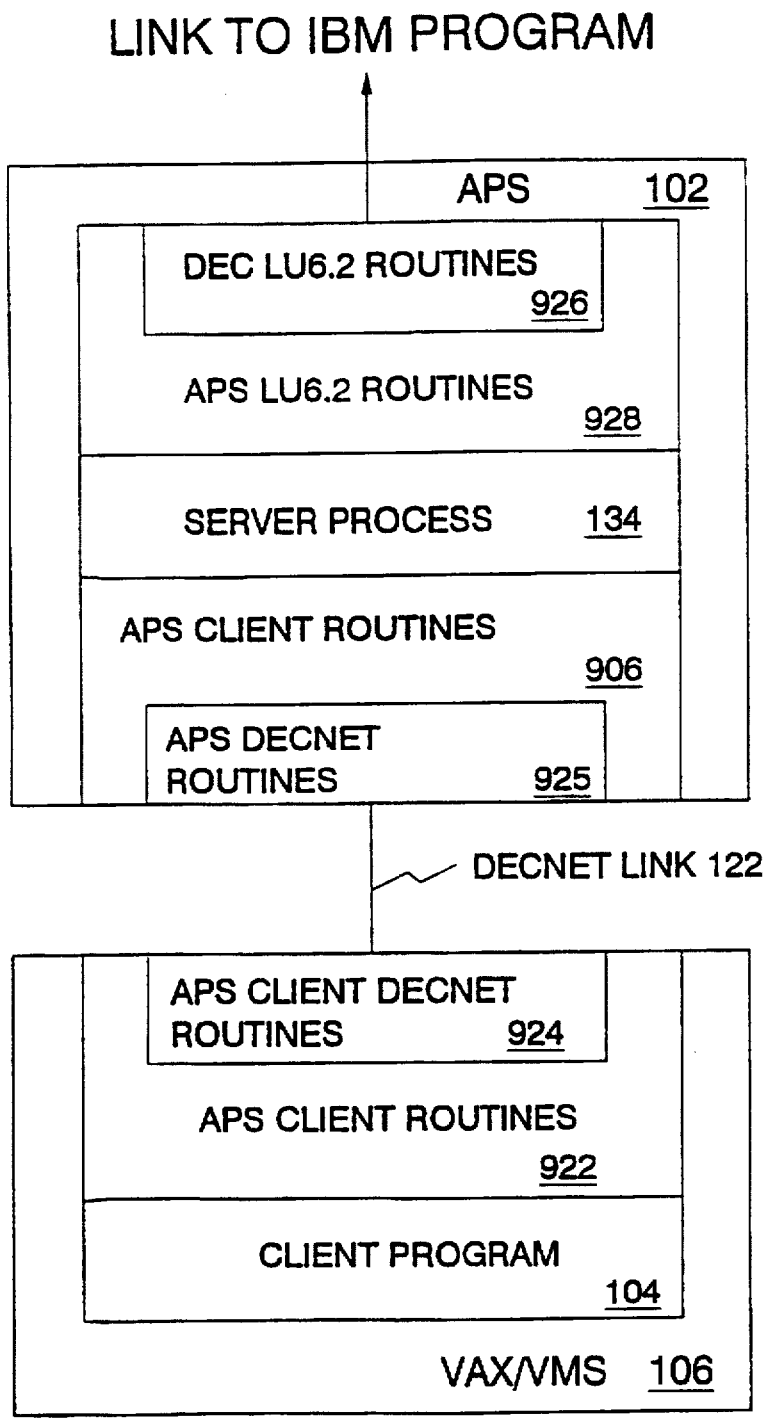
FIG. 9 is a diagram illustrating the routines used to interface the APS to two computing environments.

As mentioned above, in a preferred embodiment, APS 102 is implemented such that it forms a client-server relationship with VAXes 106. The connection between one APS server process 134 and one VAX 106 is illustrated in FIG. 9. Referring to FIG. 9, a client program 104, running in VAX 106, has routines that enable communications with APS 102. APS client routines 922 are routines that allow program 104 to communicate with APS 102. APS client routines 922 can include calls that are callable by any program language running on VAX 106. A list of these routines is illustrated in 35 Table 1.

TABLE 1

| APS CLIENT PROGRAM ROUTINES | |
|---|---|
| CPI-C Compliant Routines | |
| APS_CMACCP | Accept incoming conversation |
| APS_CMINIT | Init conversation to be allocated |
| APS_CMSSL | Set synchronization level |
| APS_CMALLC | Allocate conversation |
| APS_CMSEND | Send data |
| APS_CMRCV | Receive data or status |
| APS_CMSDT | Set deallocation type |
| APS_CMDEAL | Deallocate conversation |
| APS_CMCFM | Request confirmation |
| APS_CMCFMD | Issue confirm |
| APS_CMSERR | Send error |
| APS_CMRTS | Request to send |
| APS_CMTRTS | Test request to send received |
| APS_CMESL | Extract synchronization level |
| ADDITIONAL APS 102 CLIENT ROUTINES | |
| APS_RejectConversation | |
| APS_DefineTimeout | |
| APS_SetTraceOptions | |
| APS_DefineServerNodes | |
| APS_AddServerNodes | |

APS client routines 922 support multiple conversations with APS 102, and provide automatic backup server selection. This feature allows APS client routines 922 to select a secondary APS 102 (or one of a number of other available APSs 102) in the event that primary APS 102 fails or is otherwise unavailable or no server process 134 is available in the appropriate class. APS client DECnet routines 924 exist in VAX 106. APS DECnet routines 925 exist in APS 102. APS client DECnet routines 924 and APS DECnet routines 925 enable communications via DECnet 122.

APS client routines 906, resident in APS 102, perform the functionality necessary to establish the server-client relationship between APS 102 and at least one VAX 106.

Server process 134 provides the connectivity between VAX 106 and the IBM program to which it communicates. Server process 134 is discussed in more detail above with reference to FIGS. 1 through 5.

APS LU6.2 routines 928 and DEC LU6.2 routines 926 provide the communications protocols necessary for APS 102 to communicate via a DECnet/SNA gateway to an IBM LU6.2 program. APS LU6.2 routines provide communications capabilities to an IBM program. DEC LU6.2 routines 926 are used by the APS LU6.2 routines 924 and provide a communications capability to the DEC gateway.

Because of the layered design, in an alternative embodiment, the client-server relationship herein described, could be replaced or augmented to implement another dedicated function such as file transfer.

It should be understood that, in a first alternative aspect, the instant invention can also be a program-to-program server apparatus for interfacing at least one of a plurality of programs in a first computing environment with at least one of a plurality of programs in a second computing environment, comprising:

at least one server process configured to establish and maintain a predetermined fixed number of first sessions with the plurality of programs in the first computing environment and to establish, on receipt of a connection request, a second session with one of the programs in the second computing environment, thereby providing a communications session between the first computing environment and the second computing environment, whereby a first program in one of said first and second computing environments can communicate with a second program in the other of said first and second computing environments via said server process; and a controller process, coupled to said server process, configured to receive said connection request from said first program and to allocate a communications task to one of said server processes upon receipt of said connection request.

This first alternative aspect of the invention can further comprise a control section, coupled to the controller process, configured to store global data, and to provide the global data to the server processes and the controller process. This aspect of the invention can further include a control file, coupled to said controller process, configured to store permanent definitions for use by said controller process and to define the number of server processes available. The invention can further comprise a management utility, coupled to said controller process, configured to provide an interface for operator control of the server. This management utility can be further configured to allow operators to create additional server processes.

The invention can further include a monitoring utility, coupled to said control section, configured to retrieve data from said control section, format the data into reports and screens, and send said formatted data to a user terminal, whereby a human operator can monitor the operation of the program-to-program server apparatus. The invention can also include a gateway, coupled to said server processes, configured to provide a communications interface between said first and second computing environments.

Finally, this first alternative aspect of the invention can also include: a server process mailbox, coupled to said controller process and to said server process, configured to store commands and first messages originated by said controller process and to forward said stored commands and first messages to said server process; a controller management mailbox, coupled to said controller process and to said server process, configured to store second messages from said server process and forward said second messages to said controller process; and a process termination mailbox, coupled to said controller process and to said server process, configured to store termination messages from said server process and forward said termination messages to said controller process.

It should also be understood that, in a second alternative aspect, the instant invention can be a program-to-program server apparatus for interfacing at least one IBM program running in an IBM environment with at least one DEC program running in a DEC environment, comprising:

a server process, configured to establish and maintain a predetermined fixed number of logical unit sessions allowing a program running in an IBM environment to initiate a conversation with a program running in a DEC environment; and a controller process, coupled to said server process, configured to accept connection requests from said DEC and IBM programs and to allocate a server process to a program requesting connection.

This second alternative aspect of the invention can further include first means, coupled to said controller process, for storing global data and for providing said global data to said server process and said controller process. This aspect of the invention can further include second means, coupled to said first means, for storing permanent definitions for use by said controller process.

This second alternative aspect of the invention can further comprise: first means, coupled to said controller process and to said server process, for storing commands and first messages originated by said controller process and for forwarding said stored commands and first messages to said server process; second means, coupled to said controller process and to said server process for storing second messages from said server process and for forwarding said second messages to said controller process; and third means, coupled to said controller and to said server process, for storing termination messages from said server process and forwarding said termination messages to said controller process.

7. Conclusion

While various embodiments of the present invention have been described above, it should be understood that they have been presented by way of example only, and not limitation. Thus, the breadth and scope of the present invention should not be limited by any of the above-described exemplary embodiments.

What is claimed is:

1. An integrated computer environment, comprising:

a business computing environment, comprising at least one first computing system configured to run business programs;

a plurality of second computing systems, configured to run client application programs, wherein said first and second computing systems are not of the same computing environment;

a gateway configured to allow communication between said business programs running on said first computing system and said client application programs running on one of said plurality of second computing systems;

an advanced program-to-program server, configured to establish and maintain a predetermined fixed number of first sessions with said business programs running on said first computing system and to establish, on receipt of a connection request, a second session with one of said client application programs running on one of said plurality of second computing systems, thereby establishing a server/client relationship such that said client application programs in each of said plurality of second computing systems can communicate with said business programs in said first computing system via said gateway; and an installed client-server program in each of said second computing systems for providing transparent communication between any of said client application programs and said first computing system, said installed client-server program having routines for enabling communication session connectivity to said advanced program-to-program server.

2. A computer integrated environment, comprising:

an IBM LU6.2 computing environment, configured to run business programs;

a VAX/VMS computing environment, configured to run client application programs;

an installed client-server program in said VAX/VMS computing environment for providing transparent communication between any of said client application programs and any of said business programs, said installed client-server program having routines for enabling communication session connectivity to an advanced program-to-program server; and an advanced program-to-program server, configured to establish a server/client relationship such that said client application programs can communicate with said business programs, wherein said advanced program-to-program server comprises:
- a server process, configured to establish and maintain a predetermined fixed number of logical unit sessions allowing said business programs to initiate conversations with said client application programs; and
- a controller process, coupled to said server process, configured to accept connection requests from said business and client application programs and to allocate a server process to a program requesting connection.

3. The system of claim 2, further comprising a gateway configured to allow communications between said business programs and said client application programs.

4. A method for interfacing at least one of a plurality of programs in a first computing environment configured to run business programs with at least one of a plurality of programs in a second computing environment configured to run client application programs, comprising the steps of:

(a) providing an advanced program-to-program server, configured to establish a server/client relationship such that said client application programs can communicate with said business programs, said advanced program-to-program server having
- a server process, configured to establish and maintain a predetermined fixed number of logical unit sessions allowing said business programs to initiate conversations with said client application programs, and
- a controller process coupled to said server process, configured to accept connection requests from said business programs and client application programs and to allocate a server process to a program requesting connection;

(b) installing a client-server program in said second computing environment for providing transparent communication between any of said client application programs and any of said business programs, said installed client-server program having routines for enabling communication session connectivity to said advanced program-to-program server;

(c) allocating a server process to a first program in one of the first and second computing environments, said first program requesting a session with a second program in the other of the first and second computing environments;

(d) establishing a first session between said first program and said allocated server process; and (e) establishing a second session between said second program and said allocated server process;

wherein said first and second sessions host a conversation between said first program and said second program.

5. The method of claim 4, further comprising the step of receiving a request from said first program for a conversation with said second program.

6. The method of claim 5, wherein said step (a) comprises the steps of:
- determining whether one of a plurality of server processes is available to provide the session requested by said first program;
- allocating said server process to said first program if said server process is available; and
- informing said first program that a server process is not available if one of said plurality of server processes is not available.

7. The method of claim 4, further comprising the step of deallocating the session said first and second programs.

8. The method of claim 7, wherein said session is deallocated in response to a termination request received from one of said first and second programs.

9. The method of claim 7, wherein said server processes are initially created by said controller process.

10. The method of claim 7, wherein said server processes are created when said requesting program requests connection to said specified program.

11. The method of claim 7, further comprising the step of attempting to re-establish said session if said session terminates prematurely.

12. The method of claim 4, further comprising the step of performing protocol conversions necessary to effectuate communications between said first and second programs.

* * * * *